United States Patent [19]

Fisher

[11] Patent Number: 4,475,611
[45] Date of Patent: Oct. 9, 1984

[54] SCAFFOLD PROPULSION UNIT

[75] Inventor: Robert E. Fisher, Berkeley, Calif.

[73] Assignee: Up-Right, Inc., Berkeley, Calif.

[21] Appl. No.: 431,128

[22] Filed: Sep. 30, 1982

[51] Int. Cl.³ .................. B62D 11/06; E04G 1/26
[52] U.S. Cl. .......................... 180/6.5; 180/11;
   180/60; 180/65.1; 182/13; 188/159; 318/376
[58] Field of Search .............. 180/6.5, 15, 11, 60,
   180/71, 208, 299, 65 R, 295; 182/12, 13, 63;
   188/159; 318/376

[56] References Cited

U.S. PATENT DOCUMENTS

| | | | |
|---|---|---|---|
| 2,874,791 | 2/1959 | Mellencamp | 180/6.5 |
| 3,438,456 | 4/1969 | Hunter | 180/65 R |
| 3,731,758 | 5/1973 | Hibma | 180/11 |
| 3,930,548 | 1/1976 | Wallraff | 180/6.5 |
| 3,947,740 | 3/1976 | Tsuboi | 318/376 |
| 4,053,025 | 10/1977 | Slusarenko | 180/15 |

OTHER PUBLICATIONS

Up-Right, Berkeley, California, Sales Brochure "Aluminum Span Scaffolds".
Applied Design Products, Barrington, Illinois, Sales Brochure, "Lil Propeller".
Scaffold Scooters, Phoenix, Oregon, Sales Brochure.

Primary Examiner—Joseph F. Peters, Jr.
Assistant Examiner—D. Lynn Fugate
Attorney, Agent, or Firm—Phillips, Moore, Lempio & Finley

[57] ABSTRACT

A propulsion unit for span scaffolds having vertical castered columns at the four corners thereof. The propulsion unit includes a first elongated frame member extending between the columns on one side of the scaffold, a second elongated frame member extending between the columns on the other side of the scaffold, and a third, wheeled, frame member extending crosswise between the first and second frame members, the third frame member being mounted on the first and second frame members for limited free vertical movement relative thereto.

7 Claims, 4 Drawing Figures

SCAFFOLD PROPULSION UNIT

TECHNICAL FIELD

This invention relates to movable scaffold units having casters thereon enabling the scaffold units to be rolled from place to place, and in particular to a propulsion unit which may be attached to such a scaffold unit to provide power for scaffold movement.

BACKGROUND OF THE INVENTION

At the present time, various mobile scaffold units are in common use. Typically, these units include a framework made of structural tubing, with four vertical columns at the four corners of the unit, various horizontal and diagonal cross braces, and an elevated work platform supported on the framework. Typically, such scaffolds may be of single or double width, the single width being small enough so that the scaffold unit may be moved through standard 30-inch doorways, and the double width providing more platform area. Such scaffold units come in various standard lengths, such as six, eight or 10 feet. Such scaffold units have casters mounted on the lower end of the four corner columns to enable the scaffold units to be rolled from place to place. Usually, each caster includes an adjustable leg enabling the height of each column to be adjusted relative to the floor on which the caster rests. Such adjustment will typically enable the work platform to be adjusted by up to about 12 inches.

In normal use by one workman, the workman will roll the scaffold unit to a place where work is to be done, and he will then climb up to the scaffold platform to perform the work. If it is then desired to move the scaffold a short distance to a new position so that the work may be continued, the workman must climb down to the floor, roll the scaffold to the new position and remount the scaffold to continue the job.

There are times when it would be desirable to have such a scaffold equipped with a propulsion unit so that the workman could move and steer the scaffold to a new location without demounting from the elevated platform.

There are several problems in providing a suitable power drive for such a scaffold unit.

A first problem is that the tubing framework of most movable scaffolds is relatively lightweight and the castered columns are not designed to withstand the relatively high lateral forces that could be imposed on the unit when it is power driven.

Another problem is that such a scaffold unit with a workman on the platform will have a relatively high center of gravity and a consequent reduction in low degree of stability when subjected to lateral forces.

A still further problem is that it is desirable that the scaffold unit, when power driven, be able to go over relatively small obstacles, such as a piece of plasterboard, but not to be able to go over obstacles of such thickness as may cause an excessive degree of tilting of the scaffold.

In addition, it is desirable that a propulsion unit for such a scaffold provide for easy maneuvering of the scaffold, and that it be easily and quickly attached to or detached from the scaffold.

Further, it is desirable that the scaffold be easily and manually moved by a workman on the ground when the propulsion unit is attached to the scaffold.

It is the object of the present invention to overcome one or more of the above problems and to meet one or more of the above desires.

SUMMARY OF THE INVENTION

In one aspect of the invention, a scaffold propulsion unit is provided for use with a movable scaffold having castered columns at the four scaffold corners, in which the propulsion unit has a first frame member adapted to extend between columns on one side of the scaffold, a second frame member adapted to extend between the columns on the other side of the scaffold, and a third, wheeled frame extending between the first and second frame members, the third frame member being mounted for limited free vertical movement relative to the first and second frame members, and means for providing power to the wheels of the third frame member.

A further aspect of the invention is that there are two drive wheels on the third frame members, and each drive wheel is independently powered for movement, including movement in opposite directions.

Other aspects of the invention will become apparent in the course of the following detailed description.

DESCRIPTION OF THE PREFERRED EMBODIMENT

Figure 1:
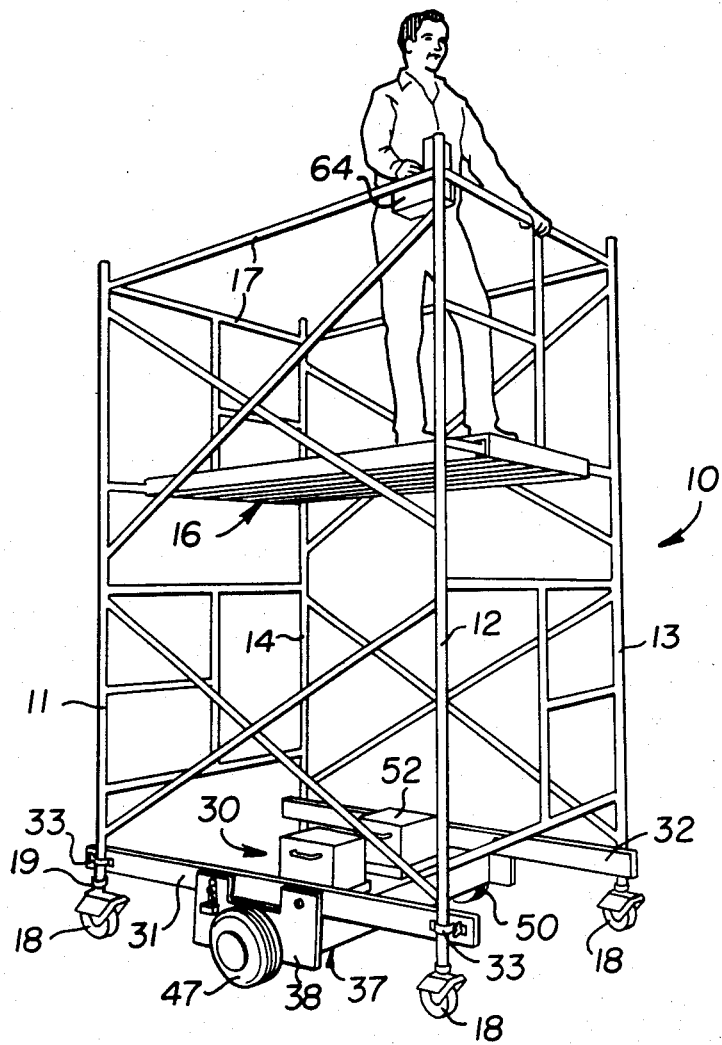
FIG. 1 is a perspective view of a conventional movable scaffold with a propulsion unit attached thereto, the propulsion unit being constructed in accordance with the present invention.
Figure 2:
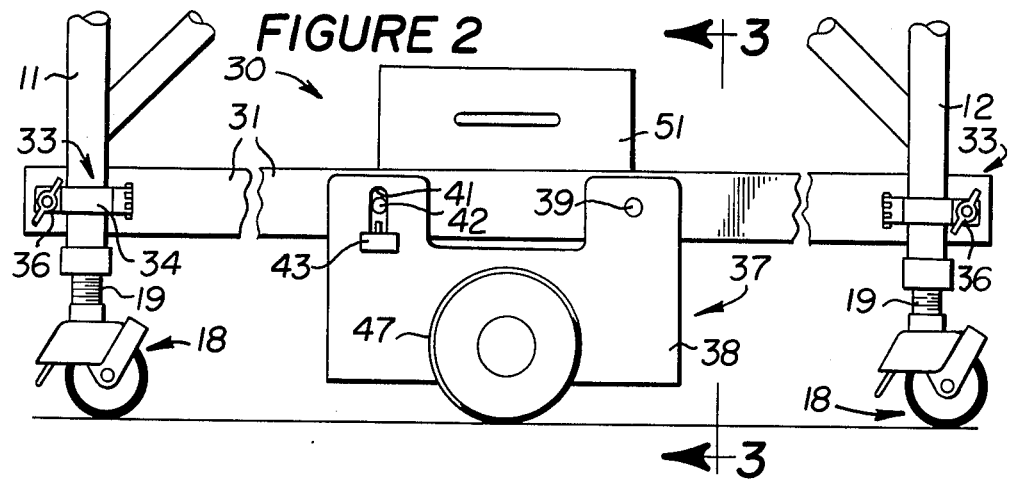
FIG. 2 is a side elevational view of the scaffold propulsion unit of FIG. 1.
Figure 3:
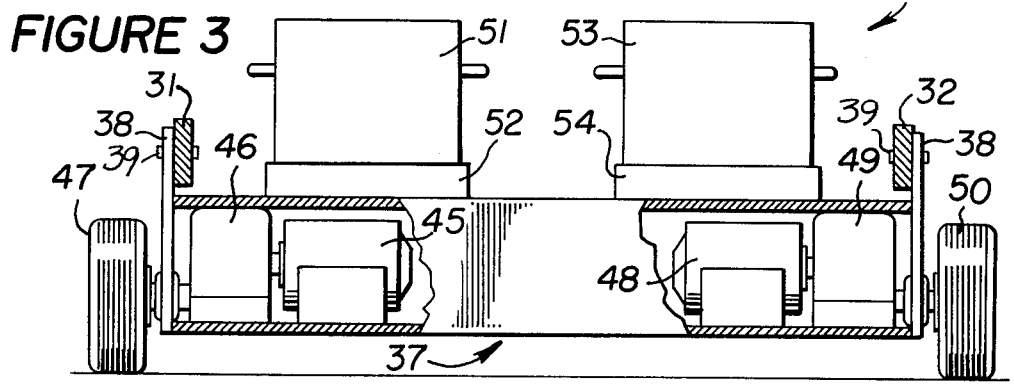
FIG. 3 is a sectional view of the scaffold propulsion unit, taken on line 3.3 of FIG. 2.

Referring now to the drawings, wherein is illustrated a preferred embodiment of the invention, FIG. 1 shows a typical scaffold unit 10 having vertical castered columns 11, 12, 13 and 14 at the four corners of the scaffold unit, an elevated work platform 16 and upper guard rails 17. Each castered column has a caster 18 on the lower end thereof. Also, typically, each caster 18 has a threaded leg 19 extending up into the column thereabove to permit the height of the column to be adjusted relative to the caster. An example of such a leg adjustment is shown is U.S. Pat. No. 3,224,800.

The scaffold propulsion unit of the present invention is designated generally by the reference number 30. The propulsion unit comprises a first elongated, rigid frame member 31 extending between the castered columns 11 and 12 on one side of the scaffold unit 10, and a second elongated rigid frame member 32 extending between the castered columns 13 and 14 on the other side of the scaffold unit.

The frame member 31 has a clamp 33 thereon to enable the frame member 31 to be quickly and easily attached to column 11 or detached therefrom. The clamp 33 may comprise a strap portion 34 connected to frame member 31 and adapted to encircle column 11, the strap being secured firmly to the column by a bolt and wingnut 36. When tightened, the clamp 33 will hold the frame member 31 securely to column 11 and prevent relative vertical movement therebetween. Frame member 31 has a similar clamp 33 at its other end for attachment to column 12, and frame member 32 has similar clamps 33 (not shown) at both ends thereof for attachment to columns 13 and 14.

A third frame member 37 extends cross-wise of the propulsion unit between the mid-portions of the first and second frame units 31 and 32, the third frame member 37 being mounted on the first and second frame members 31 and 32 for limited free vertical movement relative thereto. In particular, the third frame member 37 includes a vertical end plate 38 which is pivotally connected to frame member 31 by a horizontal pivot pin 39. End plate 38 also has a generally vertical slot 41 into which pin 42 projects, pin 42 being fixed to frame member 31. For reasons to be described in more detail below, a normally closed micro-switch 43 is preferably mounted on end plate 38, switch 43 being adapted to be actuated to open position upon upward pivotal movement of the third frame member 37 relative to frame member 31 to the extent allowed by engagement of pin 42 with the bottom of slot 41.

The other end of the third frame member 37 has a similar end plate 38 pivotally connected to the second frame member 32 for limited relative vertical pivotal movement of the third frame member 37 relative to the second frame member 32, in the same manner as described above.

Disposed within the third frame member 37 is a first electric drive motor 45 connected through gear box 46 to drive wheel 47 at one end of the third frame member 37, and a second electric drive motor 48 connected through gear box 49 to drive wheel 50 at the other end of the third frame member 37.

A pair of battery boxes 51 and 52 fit into receptacles 53 and 54 on top of the third frame member, to provide electric power for the propulsion unit. Preferably the battery boxes and receptacles provide an automatic electrical connection between the batteries inside the boxes and the propulsion unit when the battery boxes are lowered into place in the receptacles.

Figure 4:
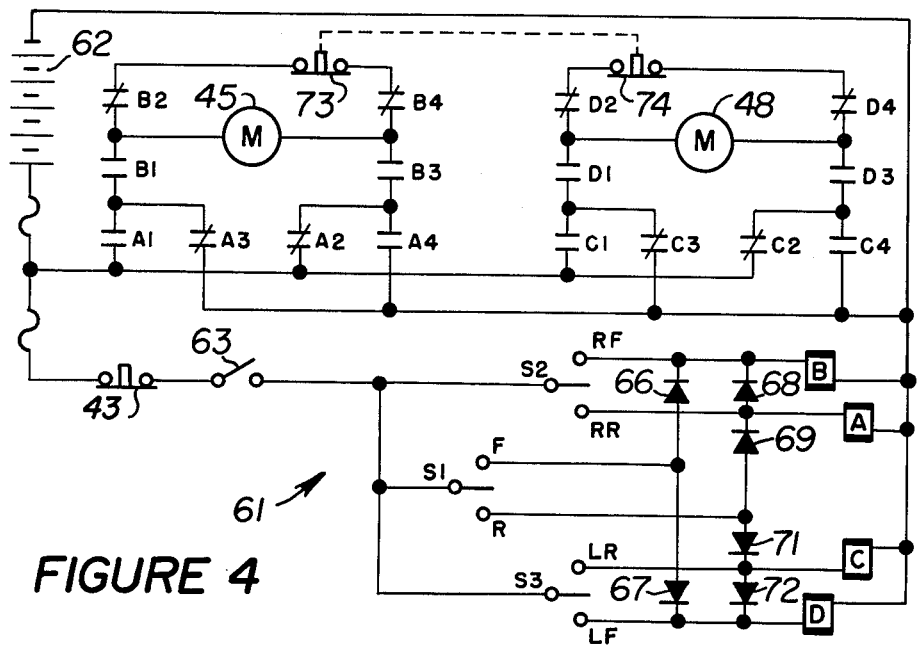
FIG. 4 is a circuit diagram of a control means for the scaffold propulsion unit of the present invention.

FIG. 4 illustrates a control circuit 61 for the propulsion unit 10 described above. The power source 62, i.e., the batteries in the battery boxes 51 and 52, is connected through microswitch 43 and main disconnect switch 63 to switches S1, S2 and S3. The main switch 63 and switches S1, S2 and S3 are all located at the control panel 64 which is disposed at the top of the scaffold unit for operation by the workman.

With main switch 63 closed, switch S1 is used to deliver power simultaneously to both the right and left wheel drive motors 45 and 48. If switch S1 is moved to the forward (F) position, power is delivered through diodes 66 and 67 to energize relays B and D. Current will now flow through relay contacts A2 and B3, motor 45, and relay contacts B1 and A3. Likewise, current will flow through relay contacts C2 and D3, motor 48, and relay contacts D1 and C3.

If switch S1 is moved to the reverse (R) position, power will be supplied through diodes 68, 69, 71 and 72 to energize all of the relays A, B, C and D. Current will now flow in the opposite direction through motors 45 and 48, i.e., current will flow through motor 45 through the path provided by relay contact A1, B1, B3 and A4, while current flows through motor 48 by the path provided by relay contacts C1, D1, D3 and C4.

The B2 and B4 contacts of relay B will short out the armature of motor 45 when relay B is not energized, to provide regenerative, or dynamic, braking for the right drive wheel 47. Likewise, if relay D is not energized, its relay contacts D2 and D4 will short across the armature of motor 48 to provide braking for the left drive wheel 50.

Switches S2 and S3 are provided for individual control of motors 45 and 48. As may be seen, switch S2 may be moved to its forward position (F) to energize relay B alone, or its reverse position (R) to energize both relays A and B. Similarly, switch S3 can be moved to energize relay D alone, or relays C and D together.

The control circuit 61 also includes two normally closed and ganged together switches 73 and 74 in the brake circuits for motors 45 and 48. As described above, relay contacts B2, B4, D2 and D4 will be closed, shorting out motors 45 and 48, whenever power is not being supplied to the motors. Switches 73 and 74 allow a workman on the ground to remove the shorting across the motors, and the braking effect thereof, so that the scaffold unit can be pushed along the floor.

In use, the propulsion unit 30 is mounted on the scaffold 10 by clamping elongated frame members 31 and 32 to the castered columns as described above. In so doing, the frame members 31 and 32 are set at a height so that the pins 42 are above the bottom of the slots 41.

The workman may now operate the propulsion unit 30 while standing on the work platform 16. The scaffold is very maneuverable since it may be driven forwardly or rearwardly by operation of switch S1 or the scaffold may be turned by operation of switches S2 and S3. If switch S2 is operated alone, the right drive wheel 47 will be driven and the scaffold will turn about the braked left drive wheel 50. If switches S2 and S3 are both operated, but in opposite directions, then the scaffold will turn about a point midway between the drive wheels.

Preferably, large industrial batteries, weighing in the order of 75 pounds each, are used. This has a double advantage in that the operating time between battery recharging is increased, and the weight of the batteries provides a ballast, close to the ground, which increases the stability of the scaffold.

The first and second frame members 31 and 32 provide the necessary strength to the scaffold to resist the forces imposed by a power drive, since the axes of rotation of the drive wheels 47 and 50 are crosswise to the length of the first and second frame members. As is seen in FIG. 1, if the scaffold is being power driven and a caster 18 is driven against a vertical abutment, the force imposed on the caster and the scaffold column thereabove will be in a direction parallel to the frame member 31 or 32 which is connected to the column just above the caster. As a consequence, these frame members will stiffen the scaffold in the necessary direction, and at a low elevation on the castered columns so that undue bending forces will not be imposed on these columns.

The floating action of the wheeled third frame member 37 is advantageous in that the downward force on the drive wheels 47 and 50 is a function solely of the weight of the third frame member 47 and the batteries thereon and is independent of the weight of the scaffold and the load thereon. As a consequence, the load capacity is limited by the frictional traction obtainable with the constant weight on the drive wheels. In turn, this will add in preventing the scaffold from being power driven when it is improperly overloaded.

The floating action of the wheeled third frame member is also advantageous in that the wheels 47 and 50 can be driven over relatively thin obstacles such as boards or the like, without causing the scaffold to tilt. The independent vertical movement of the wheeled third frame 37 relative to the scaffold and first and second frame members makes it easy to provide switch 43 to shut off power to the motors in the event of a predetermined amount of such relative movement so that the drive wheels will be prevented from being driven over an undesirably thick obstacle.

As mentioned previously, a workman can open switches 73 and 74 to disable the regenerative braking on the motors if it is desired to move the scaffold manually, without power being applied. If the scaffold unit has adjustable legs, a workman can easily adjust the legs to move columns 11, 12, 13 and 14 upwardly. Sufficient upward movement will cause pins 41 to engage the upper ends of slots 42 so that the wheels 47 and 50 are picked up off the floor. The scaffold can then be rolled on its casters 18 alone without any resistance to movement being caused by the gear boxes 46 and 49.

The foregoing description of a preferred embodiment of the invention has been presented for purposes of illustration and description. The embodiment illustrated herein was chosen and described in order to best explain the principles of the invention and its practical application to thereby enable others in the art to best utilize the invention in various embodiments and with various modifications as are suited to the particular use contemplated. The description is not intended to be exhaustive or to limit the invention to the precise form disclosed, and obviously many modifications and variations are possible in light of the above teaching. For example, hydraulic drive motors and a hydraulic circuitry, powered by either electricity or an internal combustion engine, can be substituted for the electric motors and control circuit described herein. It is intended that the scope of the invention be defined by the claims appended hereto.

I claim:

1. A scaffold propulsion unit for use with a movable scaffold having castered columns at the four scaffold corners, said propulsion unit comprising:
    a first elongated, rigid frame member adapted to extend between the castered colums on one side of said scaffold,
    a second elongated, rigid frame member parallel to said first frame member and adapted to extend between the castered columns on the other side of said scaffold.
    means for fastening said first and second frame members to said castered columns and for holding said first and second frame members against vertical movement relative to said scaffold,
    a third frame member extending between said first and second frame members,
    first and second drive wheels mounted on said third frame member, one at either end thereof,
    mounting means for mounting said third frame member on said first and second frame members with the axes of rotation of said drive wheels being crosswise to the lengths of said first and second frame members and for limited free vertical movement of said drive wheels relative to said first and second frame members,
    a power source,
    first and second drive motors mounted on said third frame member,
    means for driving said first and second wheels in repsonse to respective energization of said first and second motors, and
    control means for connecting and disconnecting said motors to and from said power source.

2. A scaffold propulsion unit as set forth in claim 1, wherein said mounting means includes a first horizontal pivot connection between said first and third frame members, a second horizontal pivot connection between said second and third frame members, a first generally vertical slot in one of said first and third frame members and a first pin on the other of said first and third frame members, said first pin extending into said first slot, a second generally vertical slot in one of said second and third frame members and a second pin on the other of second and third frame members, said second pin extending into the second slot.

3. A scaffold propulsion unit as set forth in claim 2, wherein said power source comprises at least one battery mounted on said third frame member, wherein said drive motors are electrical motors, and wherein said control means has the further functions of independently and reversibly connecting each of said motors to said power source and for shorting across each of said motors upon disconnection of said motors from said power source.

4. A scaffold propulsion unit as set forth in claim 2, wherein said power source comprises at least one battery mounted on said third frame member, wherein said drive motors are electrical motors, and wherein said control means has the further function of disconnecting said motors from said power source in response to a predetermined amount of vertical movement of said drive wheels relative to said first and second frame members.

5. A scaffold propulsion unit as set forth in claim 1, wherein said power source comprises at least one battery mounted on said third frame member, wherein said drive motors are electrical motors, and wherein said control means has the further functions of independently and reversibly connecting each of said motors to said power source and for shorting across each of said motors upon disconnection of said motors from said power source.

6. A scaffold propulsion unit as set forth in claim 5, wherein said control means includes closable contacts across each motor for shorting across each of said motors upon disconnection of said motors from said power supply, and wherein said control means further includes manually operable means for preventing said closable contacts from shorting across said motors when said motors are disconnected from said power supply.

7. A scaffold propulsion unit as set forth in claim 1, wherein said power source comprises at least one battery mounted on said third frame member, wherein said drive motors are electrical motors, and wherein said control means has the further function of disconnecting said motors from said power source in response to a predetermined amount of vertical movement of said drive wheels relative to said first and second frame members.

* * * * *